(12) United States Patent
Zhang et al.

(10) Patent No.: US 7,578,617 B2
(45) Date of Patent: Aug. 25, 2009

(54) ANALOG LINE-TYPE TEMPERATURE SENSITIVE FIRE DETECTION CABLE

(75) Inventors: Weishe Zhang, Beijing (CN); Gangjin Li, Beijing (CN)

(73) Assignee: Sureland Industrial Fire Safety Limited, Beijing (CN)

( * ) Notice: Subject to any disclaimer, the term of this patent is extended or adjusted under 35 U.S.C. 154(b) by 218 days.

(21) Appl. No.: 11/774,530

(22) Filed: Jul. 6, 2007

(65) Prior Publication Data

US 2008/0008226 A1 Jan. 10, 2008

(30) Foreign Application Priority Data

Jul. 7, 2006 (CN) .................... 2006 1 0101726

(51) Int. Cl.
*G01K 7/00* (2006.01)
*A62C 37/00* (2006.01)

(52) U.S. Cl. ..................................... 374/178
(58) Field of Classification Search .............. 374/178, 374/8; 337/401
See application file for complete search history.

(56) References Cited

U.S. PATENT DOCUMENTS

| 2,764,659 | A | * | 9/1956 | Postal | 338/26 |
| 2,848,587 | A | * | 8/1958 | Postal | 338/26 |
| 4,400,680 | A | * | 8/1983 | Heline, Jr. | 337/415 |
| 4,540,972 | A | * | 9/1985 | Davis | 338/26 |
| 4,647,710 | A | * | 3/1987 | Davis | 136/237 |
| 5,185,594 | A | * | 2/1993 | DeChurch | 340/596 |
| 6,288,372 | B1 | * | 9/2001 | Sandberg et al. | 219/544 |

FOREIGN PATENT DOCUMENTS

| CN | 1773232 | 5/2006 |
| EP | 1455320 | 9/2004 |
| EP | 1876574 | 1/2008 |
| GB | 530538 | 12/1940 |

OTHER PUBLICATIONS

European Search Report for EP No. 07111718.8, Aug. 30, 2007 (mailing date), Zhang, et al.

* cited by examiner

*Primary Examiner*—Andre J Allen
(74) *Attorney, Agent, or Firm*—Adeli & Tollen LLP

(57) ABSTRACT

The present invention relates to an analog line-type temperature sensitive detection cable including two detection conductors arranged in parallel. A NTC characteristic obstructive layer and a fusible insulation layer are provided between the two detection conductors arranged in parallel, characterized in that a intermittent conductive layer is provided between the NTC characteristic obstructive layer and the fusible insulation layer along longitudinal direction of the fire detection cable, wherein at least one of the two detection conductors is an elastic conductor. The invention overcomes the defects of the inaccurate alarm temperature caused by insufficient conductiveness of the two detection conductors while the analog line-type temperature sensitive detector having a fusible insulation layer in the prior art is heated.

15 Claims, 3 Drawing Sheets

ANALOG LINE-TYPE TEMPERATURE SENSITIVE FIRE DETECTION CABLE

TECHNICAL FIELD

The present invention generally relates to an analog line-type temperature sensitive fire detection cable, which is formed by adding a fusible insulation layer and an intermittent conductive layer between two detection conductors, wherein at least one of the detection conductors is an elastic conductor. Thus, the erroneous alarm of the analog line-type temperature sensitive fire detector due to the length of the detector and the ambient temperature can be avoided.

BACKGROUND OF ART

In the prior art, an advanced fire detection cable comprises two detection conductors arranged in parallel, and a NTC characteristic obstructive layer and a fusible insulation layer are provided between the two detection conductors, such as the analog line-type temperature detection cable disclosed in Chinese Patent Application Nos. 200520121813.2 and 200510114820.4 of the same applicant of the present application.

FIG. 1 illustrates an advanced analog line-type temperature sensitive detection cable in the prior art. Referring to FIG. 1, in the detection cable, there are two detection conductors 1 and 2 (or thermocouple wires) arranged in parallel, wherein a NTC characteristic obstructive layer 3 (NTC characteristic refers to a negative temperature coefficient) and a fusible insulation layer 4 is provided between the two detection conductors. When the temperature of the detection cable continues to increase after being heated, and then reaches a temperature that may fuse the fusible insulation layer, the fusible insulation layer is fused or softened. Thus, the distortion stress in the two detection conductors eliminates the insulation resistance of the fusible insulation layer between the two detection conductors. The detection cable transforms the normal NTC analog or CTTC (or FTLD) continuous thermocouple line-type fire detection cable. The resistance (or voltage) between the two conductors in parallel may reduce (or rise) following the rising of temperature, then the fire alarm can be conducted according to the amount of the variation of the other electrical parameters caused by the resistance (or voltage) or variation of the resistance (or voltage). When the fusible insulation layer in the detection cable fuses or softens, the deformation stress within the detection conductor only eliminates the insulation resistance of one or more points of part of the fusible insulation layer between the two detection conductors of the heated parts of the detection cable. The reliable and accurate alarm cannot be achieved according to the contacting of these points, because of the unstable variation of the resistance or voltage or any other parameters between the two detection conductors of the detection cable following the rising of temperature. The temperature for alarm is not accurate because the two detection conductors cannot be conducted substantially when the analog line-type temperature sensitive detector having a fusible insulation layer is heated. Therefore, an analog line-type temperature sensitive fire detection cable overcoming the above-mentioned defects is needed.

SUMMARY OF THE INVENTION

One object of the present invention is to provide an analog line-type temperature sensitive fire detection cable. The cable has a fusible insulation layer and a NTC characteristic obstructive layer disposed between two detection conductors (or thermocouple wires) arranged in parallel, and further comprises an intermittent conductive layer between the fusible insulation layer and the NTC characteristic obstructive layer along the longitudinal direction. At least one of the detection conductors is an elastic conductor. The range of fusion temperature of the fusible insulation layer is between 20° C. and 140° C. The conductive length of each section of the intermittent conductive material is 0.05 to 2 m, while the intervals between the sections of the conductors are 0.1 to 10 mm.

The present invention provides an analog line-type temperature sensitive fire detection cable comprising two detection conductors arranged in parallel. A fusible insulation layer and an NTC characteristic obstructive layer are provided between the detection conductors arranged in parallel. The cable is characterized in that a intermittent conductive layer is provided in the longitudinal direction of the fire detection cable and between the NTC characteristic obstructive layer and the fusible insulation layer, and at least one of the detection conductors is an elastic conductor.

In the analog line-type temperature sensitive fire detection cable according to the present invention, the two detection conductors, the NTC characteristic obstructive layer, the fusible insulation layer, and the intermittent conductive layer may be provided in parallel with each other.

In the analog line-type temperature sensitive fire detection cable according to the present invention, one of the two detection conductors is coated with the NTC characteristic obstructive layer or the fusible insulation layer. The intermittent conductive layer is wound on the NTC characteristic obstructive layer or the fusible insulation layer. Alternatively, the intermittent conductive layer is provided outside the NTC characteristic obstructive layer or the fusible insulation layer, and is parallel with the detection conductor or coaxial with the detection conductor.

In the analog line-type temperature sensitive detection cable according to the present invention, the two detection conductors may be provided in parallel with each other or be twisted together or be coaxially disposed with respect to each other.

The advantage of the present invention comparing to the prior art is that the defects of the inaccurate alarm temperature caused by insufficient conductiveness of the two detection conductors when the analog line-type temperature sensitive detector having a fusible insulation layer is heated.

DETAILED DESCRIPTION OF THE EMBODIMENTS

An analog line-type temperature sensitive detection cable of the invention includes two detection conductors arranged in parallel. A NTC characteristic obstructive layer 7 and a fusible insulation layer 6 are provided between the two detection conductors arranged in parallel. An intermittent conductive layer 8 is provided between the NTC characteristic obstructive layer and the fusible insulation layer and intermittently conductive in the longitudinal direction.

Figure 1:
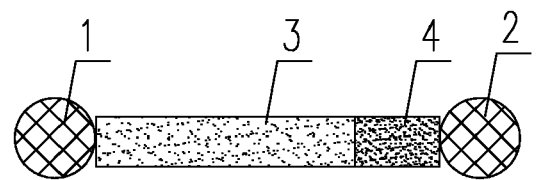
FIG. 1 is a schematic view illustrating an analog line-type temperature sensitive detection cable of the prior art.
Figure 2:
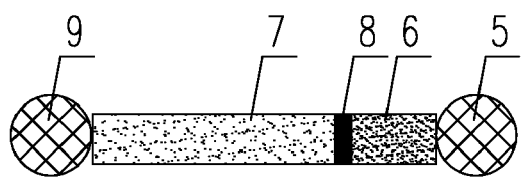
FIG. 2 is a schematic view showing an analog line-type temperature sensitive detection cable according to an embodiment of the present invention.

FIG. 2 shows an analog line-type temperature sensitive detection cable according to an embodiment of the present invention. Referring to FIG. 2, the analog line type temperature sensitive fire detection cable of the present invention comprises two detection conductors 9 and 5 arranged in parallel, a NTC characteristic obstructive layer 7, an intermittent conductive layer 8, and a fusible insulation layer 6. The NTC characteristic obstructive layer 7 and the fusible insulation layer 6 are provided between the two detection conductors, and the intermittent conductive layer 8 is provided between the NTC characteristic obstructive layer 7 and the fusible insulation layer 6 along the longitudinal direction, and is intermittently conductive along the longitudinal direction. At least one of the two detection conductors 9 and 5 is an elastic conductor. The range of the fusion temperature of the fusible insulation layer 6 is between 20° C. and 140° C. The conductive length of each section of the intermittent conductive material is 0.05 to 2 m. The intervals between each section of the conductors, namely the length that is not conductive, are 0.1 to 10 mm.

In the analog line-type temperature sensitive detection cable of the present invention, the two detection conductors arranged in parallel means that the two detection conductors are aligned in a manner such as side-by-side, twisted or coaxial. The twisted manner includes the situation where one of the detection conductors is wound on the other detection conductor, or the situation where the two detection conductors are wound on each other.

Figure 3:
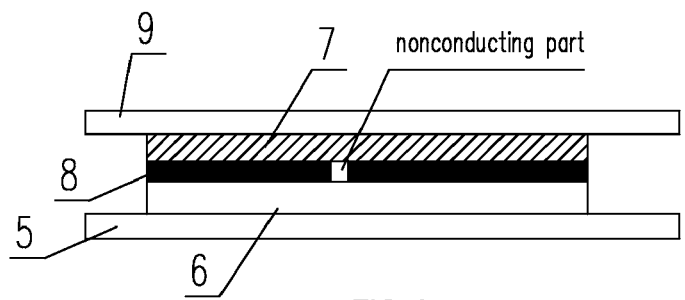
FIG. 3 is a schematic view showing an analog line-type temperature sensitive detection cable according to another embodiment of the present invention.

FIG. 3 shows an embodiment of two detection conductors 9, 5 arranged side-by-side. In the embodiment, the two detection conductors 9, 5 are parallel to each other. A NTC characteristic obstructive layer 7 and a fusible insulation layer 6 are provided between and along the two detection conductors 9, 5. An intermittent conductive layer 8 is provided between the NTC characteristic obstructive layer 7 and the fusible insulation layer 6 along the longitudinal direction for being intermittently conductive in the longitudinal direction.

Figure 4:
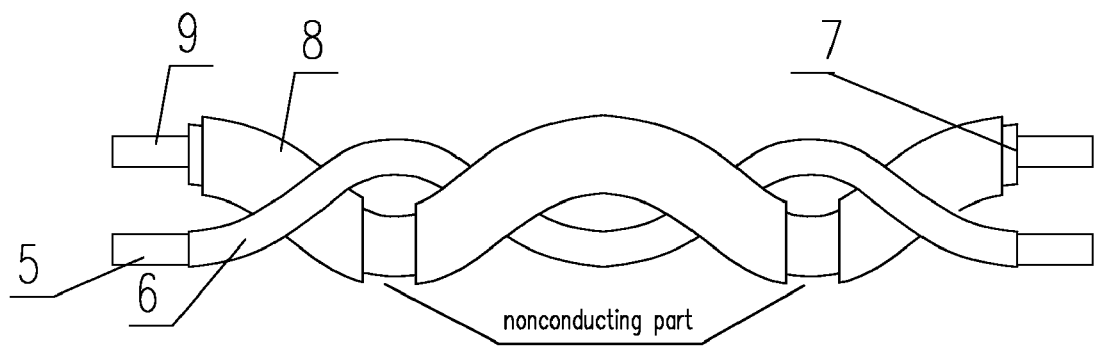
FIG. 4 is a schematic view showing an analog line-type temperature sensitive detection cable according to another embodiment of the present invention.

FIG. 4 shows an embodiment having two detection conductors 9, 5 twisted together. Referring to FIG. 4, in the embodiment, two detection conductors 9, 5 are twisted together. One of the two detection conductors 9, 5, for example, the detection conductor 9 in FIG. 4, is coated with a NTC characteristic obstructive layer 7, while the other detection conductor, for example, the detection conductor 5, is coated with a fusible insulation layer 6. An intermittent conductive layer 8 is applied on the NTC characteristic obstructive layer 7, and is intermittently conductive in the longitudinal direction. Obviously, the intermittent conductive layer 8 can also be applied on the fusible insulation layer 6.

Figure 5:
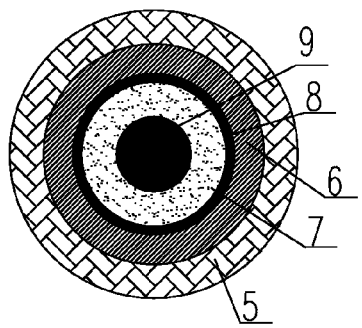
FIG. 5 is a schematic view showing an analog line-type temperature sensitive detection cable according to another embodiment of the present invention.

FIG. 5 shows an embodiment having two detection conductors 9, 5 provided coaxially. In the present embodiment, the detection conductor 9 is a core type conductor, while the detection conductor 5 is a sleeve type conductor. Thus, the sleeve type conductor 5 may enclose the core type conductor 9 to form a coaxial cable structure. In the embodiment, the detection conductor may be a hollow wire, a solid wire, or metal fiber fabric wire. Obviously, the coaxial structure is also one form of the parallel structure.

In the analog line-type temperature sensitive detection cable according to the invention, the NTC characteristic obstructive layer and the fusible insulation layer may employ the conventional manner of applying the insulation on electrical wires or the manner of winding the NTC strips so as to be incorporated with the detection conductors. For instance, the NTC characteristic obstructive layer and the fusible insulation layer can be applied on a detection conductor respectively. That is, one of the detection conductors is coated with a fusible insulation layer, while the other detection conductor is coated with a NTC characteristic obstructive layer, as shown in FIG. 4. Alternatively, at least one of the two detection conductors may be coated with a NTC characteristic obstructive layer and a fusible insulation layer in an order from inside to outside. Also, at least one of the two detection conductors may be coated with a fusible insulation layer and a NTC characteristic obstructive layer in an order from inside to outside, etc.

In the invention, the intermittent conductive layer is provided between the NTC characteristic obstructive layer and the fusible insulation layer, and may be provided in one of the following manners: twisted, side-by-side, coaxial, or any other known manner.

Outside the above-mentioned detection conductor coated with a NTC characteristic obstructive layer and a fusible insulation layer means outside the NTC characteristic obstructive layer or the fusible insulation layer.

Figure 6:
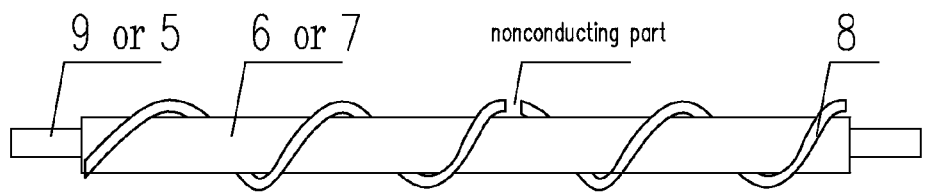
FIG. 6 is a schematic view showing the intermittent conductive layers in a twisted arrangement.

FIG. 6 schematically shows an embodiment comprising a wound intermittent conductive layer. Referring to FIG. 6, the intermittent conductive layer is wound on the outside of the above-mentioned NTC characteristic obstructive layer or the fusible insulation layer. The material of the intermittent conductive layer may be metal wire, non-metal wire, metal sheet, or metal foil etc. The material of the intermittent conductive layer may be a prefabricated intermittent conductive layer. Alternatively, the intermittent conductiveness can be achieved by processing a continuous conductive material physically (for example, by mechanical cutting) or in a chemical method after winding the continuous conductive material. In the present embodiment, the detection conductor 9 or 5 may be coated with a NTC characteristic obstructive layer 7 or a fusible insulation layer 6, and the intermittent conductive layer 8 is wound on the NTC characteristic obstructive layer 7 or the fusible insulation layer 6. In the present invention, the detection conductor coated with the NTC characteristic obstructive layer 7 or the fusible insulation layer 6 and wound with a intermittent conductive layer 8 on the outside thereof may be wound with another detection conductor in a manner including twisted, parallel, or coaxial. Further, a fusible insulation layer 6 or a NTC characteristic obstructive layer 7 is provided between the detection conductors so as to form the analog line-type temperature sensitive detection cable of the present invention.

Figure 7A:
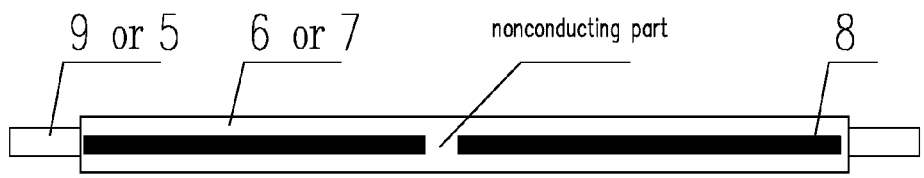
FIG. 7a and FIG. 7b are schematic views showing the intermittent conductive layers in a parallel arrangement.
Figure 7B:
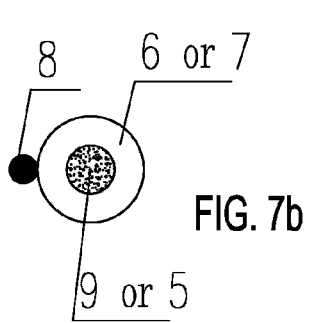

FIGS. 7a and 7b schematically show an embodiment with the intermittent conductive layers provided in parallel. Referring to FIGS. 7a, 7b, the intermittent conductive layer is provided between the NTC characteristic obstructive layer and a fusible insulation layer in a longitudinal direction and is in parallel with the NTC characteristic obstructive layer and the fusible insulation layer. In the embodiment, the detection conductor 9 or 5 may be coated with a NTC characteristics obstructive layer 7 or fusible insulation layer 6, a intermittent conductive layer 8 is provided outside the NTC characteristic obstructive layer 7 or the fusible insulation layer 6 in the longitudinal direction, and is in parallel with the detection conductor coated with the NTC characteristic obstructive layer 7 or the fusible insulation layer 6. In the invention, the detection conductor coated with the NTC characteristic obstructive layer 7 or the fusible insulation layer 6 and provided with the parallel intermittent conductive layer 8 on the outside thereof may be wound with another detection conductor in a manner including twisted, parallel, or coaxial etc. Further, a fusible insulation layer 6 or a NTC characteristic obstructive layer 7 is provided between the detection conductors so as to form the analog line-type temperature sensitive detection cable of the present invention.

In the present embodiment, the material of the intermittent conductive layer may be metal wire, non-metal wire, metal sheet, metal foil, conductive adhesive, or coating layer etc. For the material of metal wire, non-metal wire, metal sheet, or metal foil, the intermittent conductive layer may be formed with a prefabricated intermittent conductive material. Alternatively, the intermittent conductiveness can be achieved by processing a continuous conductive material physically (for example, by mechanical cutting) or in a chemical method after arranging the continuous conductive material in parallel. For the material of conductive adhesive or coating, the intermittent conductive layer may be formed from the longitudinally formed intermittent conductive strips, which formed by intermittently applying or spraying the conductive adhesive or infusing outside the above-mentioned NTC characteristic obstructive layer 7 or the above-mentioned fusible insulation layer 6, or formed into the intermittent conductive state by physical (for example mechanical cutting) or in a chemical method after applying continuous conductive paint or coating strip in a parallel manner.

Figure 8B:
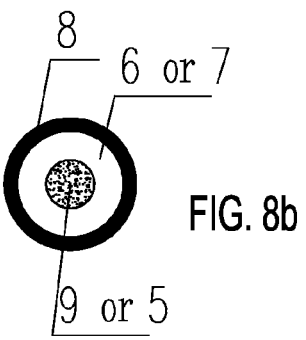
FIG. 8a and FIG. 8b are schematic views showing the intermittent conductive layers in a coaxial arrangement.
Figure 8A:
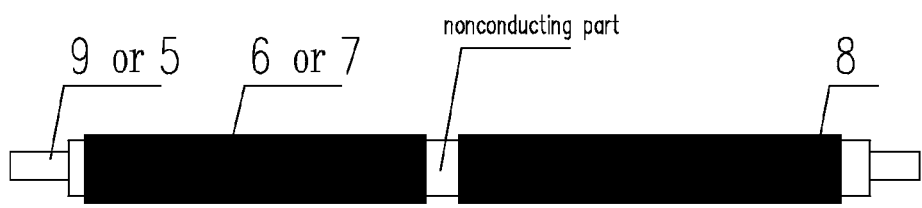

FIGS. 8a and 8b schematically show an embodiment with the intermittently conductive layer provided coaxially. Referring to FIGS. 8a and 8b, the intermittently conductive layer is an enclosed conductive layer outside a NTC characteristic obstructive layer 7 or a fusible insulation layer 6 and disposed coaxially therewith. In the embodiment, the detection conductors 9 or 5 may be coated with a NTC characteristic obstructive layer 7 or a fusible insulation layer 6, while an intermittent conductive layer 8 encloses around the NTC characteristic obstructive layer or the fusible insulation layer so as to be coaxial with detection conductor coated with the NTC characteristic obstructive layer or the fusible insulation layer. In the invention, the detection conductor coated with the NTC characteristic obstructive layer or the fusible insulation layer and having a coaxial intermittent conductive layer 8 on the outside thereof may be wound with another detection conductor in a manner including twisted, parallel, coaxial and so on. Further, a fusible insulation layer 6 or a NTC characteristic obstructive layer 7 is provided between the detection conductor of the embodiment and the other detection conductor so as to form the analog line-type temperature sensitive detection cable of the present invention.

In the embodiment, the material of the intermittent conductive layer may be metal wire, non-metal wire, metal sheet, metal foil, hollow cylindrical conductive metal sleeve, conductive adhesive, or coating layer etc. For the material of metal wire, non-metal wire, metal sheet, metal foil, or hollow conductive metal sleeve, the intermittent conductive layer may be formed with prefabricated intermittent conductive material. Alternatively, the intermittent conductiveness can be achieved by processing a continuous conductive material physically (for example, by mechanical cutting) or in a chemical method after arranging the continuous conductive material in a coaxial manner. For the material of conductive adhesive or coating, the intermittent conductive layer may be formed from the longitudinally formed intermittent conductive strips, which formed by intermittently applying or spraying the conductive adhesive or infusing outside the above-mentioned NTC characteristic obstructive layer 7 or the above-mentioned fusible insulation layer 6, or formed into intermittent state by physical (for example mechanical cutting) or chemical method after arranging the continuous conductive paint or coating strip in a parallel manner.

In the invention, the material of the fusible insulation layer may be one of wax, naphthalene, anthracene, stearic acid, and rosone, or may be one of polyvinyl chloride, polyethylene, caoutchouc, neoprene, acrylonitrile-butadiene rubber. The thickness of the fusible insulation layer may be 0.05 to 10 mm. The NTC characteristic obstructive layer (negative temperature coefficient characteristic obstructive layer) is formed of a polymer material having one of polyacetylene, polyaniline, polythiophene, polyphthalocyanine as the major conductive material. The thickness of the obstructive layer may be in a range between 0.1 mm and 5 mm. When the detection cable is heated, the temperature rises. When the temperature does not reach the range of the temperature for softening (or fusing) the fusible insulation layer, the two detection conductors are insulated from each other. When the heating temperature of the detection cable continues to increase to reach the fusing temperature of the fusible insulation layer, the fusible insulation layer fuses or is softened. Thus, the distortion stress within the two detection conductors eliminates the insulation resistance of the fusible insulation layer between one of the detection conductors at one or more points of heated part of the detection cable and the corresponding conductive section of the intermittent conductive layer. The detection conductor forms an ordinary NTC analog line-type temperature sensitive fire detection cable between the corresponding conductive section of the intermittent conductive layer and the other detection conductor, while the two detection conductors are still insulated therebetween at other parts. The resistance between the two conductors in parallel only decreases as the temperature of the heated conductive section increases. The fire alarm is then performed according to the amount of the variation of other electrical parameters caused by the resistance or the variation of the resistance.

In the analog line-type temperature sensitive detection cable of the present invention, the conductors and the insulators are relative conductors and relative insulators. The conductor and the insulator may be distinguished from each other by the ratio of the resistance of the insulator with respect to the resistance of the conductor that is greater than $10^8$.

In the analog line-type temperature sensitive detection cable of the present invention, at least one of the two detection conductors in parallel may use thermocouple wire. The measured voltage (or electrical potential) between the two detection conductors in parallel only increases as the temperature of the heated conductive section increases. Then the fire alarm is generated according to the amount of the voltage (or electrical potential) or the variation ratio thereof.

Figure 9:
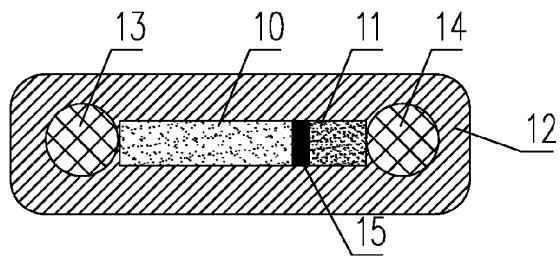
FIG. 9 is a schematic view showing an analog line-type temperature sensitive detection cable according to another embodiment of the present invention.

FIG. 9 shows another embodiment of the analog line-type temperature sensitive detection cable of the invention. Referring to FIG. 9, the analog line-type temperature sensitive detection cable includes two detection conductors 13 and 14 arranged in parallel, a NTC characteristic obstructive layer 10, an intermittent conductive layer 15, and a fusible insulation layer 11, wherein at least one of the detection conductors is an elastic conductor. The NTC characteristic obstructive layer 10 and the fusible insulation layer 11 are provided between the two detection conductors 13, 14 arranged in parallel. The intermittent conductive layer 15 is provided between the NTC characteristic obstructive layer 10 and the fusible insulation layer 11. In the analog line-type temperature sensitive detection cable of the embodiment, an insulation protective sleeve 12 is provided around and insulates the detection conductors 13, 14, the NTC characteristic obstructive layer 10, the intermittent conductive layer 15, and the fusible insulation layer 11. Obviously, for the above-mentioned embodiments, an insulation sleeve may be provided around each of the analog temperature sensitive detection cable in accordance with the present invention.

Figure 10:
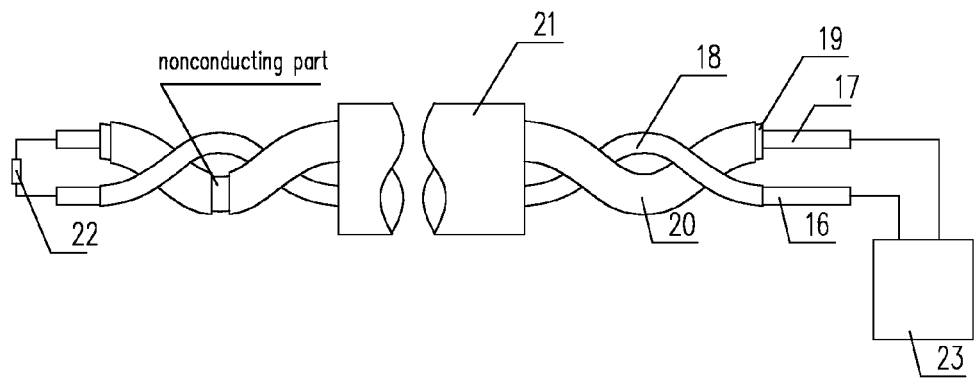
FIG. 10 is a schematic view of a line-type temperature sensitive fire detector incorporated with the analog line-type temperature sensitive fire detection cable of the invention.

FIG. 10 shows a line-type temperature sensitive fire detector comprising the analog line-type temperature sensitive fire detection cable of the present invention. Referring to FIG. 10, the analog line-type temperature sensitive fire detection cable includes two detection conductors 16, 17 arranged in parallel, a NTC characteristic obstructive layer 18, an intermittent conductive layer 20, and a fusible insulation layer 19, wherein at least one of the detection conductors is an elastic conductor. The NTC characteristic obstructive layer 18, the intermittent conductive layer 20, and the fusible insulation layer 19 are provided between the two detection conductors 16, 17 arranged in parallel. The detection conductor 16 is coated with the NTC characteristics obstructive layer 18, while the detection conductor 17 is coated with the fusible insulation layer 19. The fusible insulation layer 19 is provided with the intermittent conductive layer 20 on the outside thereof. An insulation protective sleeve 21 is provided around and insulates the detection conductors 16, 17, the NTC characteristic obstructive layer 18, the intermittent conductive layer 20, and the fusible insulation layer 19. The left end of the detection conductors 16, 17 is connected with a terminal resistor 22 in series. The resistance of the terminal resistor may be any value between 10Ω to 100Ω. The right end of the two detection conductors is connected with a resistance signal detector 23.

The elastic conductor in the present invention may be shape memory alloy wire or carbon spring steel wire. The shape memory alloy may be one of nickel-titanium shape memory alloy, nickel-titanium-copper shape memory alloy, iron based shape memory alloy, and copper based shape memory alloy. The value of the finishing temperature of the Martensite reverse transformation may be selected from a range between 20° C. and 140° C.

The invention claimed is:

1. An analog line-type temperature sensitive detection cable comprising two detection conductors arranged in parallel, wherein a NTC characteristic obstructive layer and a fusible insulation layer are provided between the two detection conductors arranged in parallel, characterized in that an intermittent conductive layer is provided between the NTC characteristic obstructive layer and the fusible insulation layer in longitudinal direction of the fire detection cable, wherein at least one of the two detection conductors is an elastic conductor.

2. The analog line-type temperature sensitive detection cable as defined in claim 1, characterized in that the intermittent conductive layer is intermittently conductive in the longitudinal direction.

3. The analog line-type temperature sensitive detection cable as defined in claim 1, wherein the two detection conductors, the NTC characteristic obstructive layer, the fusible insulation layer, and the intermittent conductive layer are arranged in parallel with respect to each other.

4. The analog line-type temperature sensitive detection cable as defined in claim 1, wherein one of the two detection conductors is coated with the NTC characteristic obstructive layer or the fusible insulation layer, while the intermittent conductive layer is wound on the NTC characteristic obstructive layer or the fusible insulation layer.

5. The analog line-type temperature sensitive detection cable as defined in claim 4, wherein said one of the two detection conductors is provided side-by-side with the other detection conductor, or wound on the other detection conductor, or disposed coaxially with respect to the other detection conductor.

6. The analog line-type temperature sensitive detection cable as defined in claim 5, wherein in the arrangement of said one detection conductor being wound on the other detection conductor, the two detection conductors are twisted together.

7. The analog line-type temperature sensitive detection cable as defined in claim 1, wherein one of the two detection conductors is coated with the NTC characteristic obstructive layer or the fusible insulation layer, while the intermittent conductive layer is disposed outside the NTC characteristic obstructive layer or the fusible insulation layer, and is disposed in parallel with said one detection conductor.

8. The analog line-type temperature sensitive detection cable as defined in claim 7, wherein said one of the two detection conductors is provided side-by-side with the other detection conductor, or wound on the other detection conductor, or disposed coaxially with respect to the other detection conductor.

9. The analog line-type temperature sensitive detection cable as defined in claim 8, wherein in the arrangement of said one detection conductor being wound on the other detection conductor, the two detection conductors are twisted together.

10. The analog line-type temperature sensitive detection cable as defined in claim 1, wherein one of the detection conductors is coated with the NTC characteristic obstructive layer or the fusible insulation layer, while the intermittent conductive layer is disposed outside the NTC characteristic obstructive layer or the fusible insulation layer, and is disposed coaxially with respect to said one detection conductor.

11. The analog line-type temperature sensitive detection cable as defined in claim 10, wherein said one of the two detection conductors is provided side-by-side with the other detection conductor, or wound on the other detection conductor, or disposed coaxially with respect to the other detection conductor.

12. The analog line-type temperature sensitive detection cable as defined in claim 11, wherein in the arrangement of said one detection conductor being wound on the other detection conductor, the two detection conductors are twisted together.

13. The analog line-type temperature sensitive detection cable as defined in any of claims 1 to 12, wherein at least one of the two detection conductors is thermocouple wire.

14. The analog line-type temperature sensitive detection cable as defined in any of claims 1 to 12, wherein at least one of the two detection conductors is shape memory alloy wire or carbon spring steel wire.

15. The analog line-type temperature sensitive detection cable as defined in claim 14, wherein material of the shape memory alloy wire is selected from one of nickel-titanium shape memory alloy, iron based shape memory alloy, and copper based shape memory alloy.

* * * * *